(12) United States Patent
Lawrence

(10) Patent No.: US 6,356,286 B1
(45) Date of Patent: Mar. 12, 2002

(54) USER-INTERACTIVE COMPUTER DISPLAY INTERFACE WITH A TREE HAVING A PLURALITY OF USER SELECTABLE NODES REPRESENTING A PLURALITY OF SEARCH QUERIES TO A TABULAR DATABASE

(75) Inventor: John Andrew Lawrence, Fishers, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,210

(22) Filed: Dec. 10, 1998

(51) Int. Cl.[7] .................................................. G06F 9/00
(52) U.S. Cl. ......................................... 345/853; 707/4
(58) Field of Search ................................ 345/333, 339, 345/342, 343, 347, 335, 962, 967, 356, 753, 764, 788, 803, 808, 744, 853; 707/1, 4, 2, 100, 101, 103

(56) References Cited

U.S. PATENT DOCUMENTS

| 5,295,261 A | | 3/1994 | Simonetti .................... 707/101 |
| 5,317,729 A | | 5/1994 | Mukherjee et al. .......... 707/203 |
| 5,469,354 A | | 11/1995 | Hatakeyama et al. ........... 704/7 |
| 5,511,186 A | | 4/1996 | Carhart et al. .................. 707/2 |
| 5,546,529 A | | 8/1996 | Bowers et al. ............... 345/355 |
| 5,619,632 A | * | 4/1997 | Lamping et al. ............. 345/356 |
| 5,778,354 A | | 7/1998 | Leslie et al. .................... 707/2 |
| 5,778,378 A | | 7/1998 | Rubin ......................... 707/103 |
| 5,787,416 A | * | 7/1998 | Tabb et al. ...................... 727/2 |
| 5,878,421 A | * | 3/1999 | Ferrel et al. ................. 707/100 |
| 5,974,407 A | * | 10/1999 | Sacks ............................. 707/2 |
| 6,058,391 A | * | 5/2000 | Gardner ......................... 707/4 |

* cited by examiner

Primary Examiner—Cao H. Nguyen
(74) Attorney, Agent, or Firm—Jeffrey S LaBaw; Jerry Kraft

(57) ABSTRACT

A computer controlled user-interactive display system interface through which the user may access stored search queries to database and then initiate selected searches executed by such queries. The interactive interface includes a displayed tree having at least one root node representative of a view into a table from the database and a plurality of subnodes under the root node, each subnode representative of a stored search query for said table view. The interface system also includes an implementation for executing a search represented by a subnode in response to a user selection of that subnode, and an expedient for presenting the results of said executed search on the display. The preferred display layout would have the tree displayed in one region of the display screen and the result of the executed search presented in a screen region next to the tree region. In this manner, the user could select a subnode representative of a particular search query, whereupon the search would be executed and the results presented to the user right next to his tree.

14 Claims, 8 Drawing Sheets

USER-INTERACTIVE COMPUTER DISPLAY INTERFACE WITH A TREE HAVING A PLURALITY OF USER SELECTABLE NODES REPRESENTING A PLURALITY OF SEARCH QUERIES TO A TABULAR DATABASE

CROSS-REFERENCE TO RELATED COPENDING PATENT APPLICATION

"A METHOD OF FORMULATING AND PRESENTING SEARCH QUERIES TO A TABULAR DATABASE THROUGH A USER-INTERACTIVE COMPUTER DISPLAY INTERFACE", John Lawrence (Attorney Docket No. AT9-98-373), filed on the same day as the present application and assigned to the same assignee.

TECHNICAL FIELD

The present invention relates to user-interactive computer supported display technology, and particularly to such user-interactive systems and methods which provide interactive users with user friendly interfaces for database management and access.

BACKGROUND OF THE INVENTION

The 1990's decade has been marked by a technological revolution driven by the convergence of the data processing industry with the consumer electronics industry. This advance has been even further accelerated by the extensive consumer and business involvement in the Internet over the past few years. As a result of these changes it seems as if virtually all aspects of human endeavor in the industrialized world require human/computer interfaces. There is a need to make computer directed activities accessible to people who, up to a few years ago, were computer illiterate or, at best, computer indifferent.

Thus, there is continuing demand for display interfaces to computers and networks which improve the ease of use for the interactive user to access functions and data from the computer. With desktop-like interfaces including windows and icons, as well as three-dimensional virtual reality simulating interfaces, the computer industry has been working hard to fulfill such interface needs. However, in the area of database management, interfaces to the databases appear to be formidable obstacles to a great many users who would have considerable needs for data access. Of course, database access and management historically was one of the original primary computer functions, and, as such, it is full of language and functions developed and communicated between computer professionals. As a result, database management and access may be somewhat esoteric and foreboding to the new computer users in businesses and personal computer situations in which they most benefit from the development of and access to databases. Terms such as relational databases (RDBMS) structured query language (SQL) searches have put off such users. Less sophisticated users find it very difficult to frame SQL search queries out of the relatively complex language. As a result, except for some limited access to databaseS through spreadsheets, the bulk of new computer users have shown a reluctance to venture into database organization and data searching. Accordingly, the computer industries are trying to address the need to make interfaces for database organization and access less foreboding and more user friendly.

SUMMARY OF THE INVENTION

The present invention furnishes one solution to the above needs by providing a data processor controlled interactive display interface through which the user may easily access stored search queries to a database and then initiate selected searches executed by such queries. The interactive interface includes a displayed tree having at least one root node representative of a view into a table from said database and a plurality of subnodes under said root node, each subnode representative of a stored search query for said table view. The interface system also includes means for executing a search represented by a subnode in response to a user selection of said subnode, and means for presenting the results of said executed search on the display. The preferred display layout would have the tree displayed in one region of the display screen and the result of the executed search presented in a screen region next to the tree region. In this manner, the user could select a subnode representative of a particular search query, whereupon the search would be executed and the results presented to the user right next to his tree. Such an arrangement would permit the user to go through a series of searches for, let us say, comparison purposes merely by clicking on a sequence of subnodes with his mouse pointer and immediately viewing his results along side of his tree on the display.

The search interface and method of the present invention is very effective in the searching of databases having tabular organization, such as relational databases. With such databases, the search results presented are preferably tabular and present aspects of the table view represented by the root node. Also, the present invention may be most effectively used when the search queries represented by the various subnodes are in SQL. In this manner, the less sophisticated user is not called upon to structure search queries in SQL. It should also be noted that the displayed tree may have a plurality of root nodes, each of which is representative of a view into a given table in the database.

DETAILED DESCRIPTION OF THE PREFERRED EMBODIMENT

Figure 1:
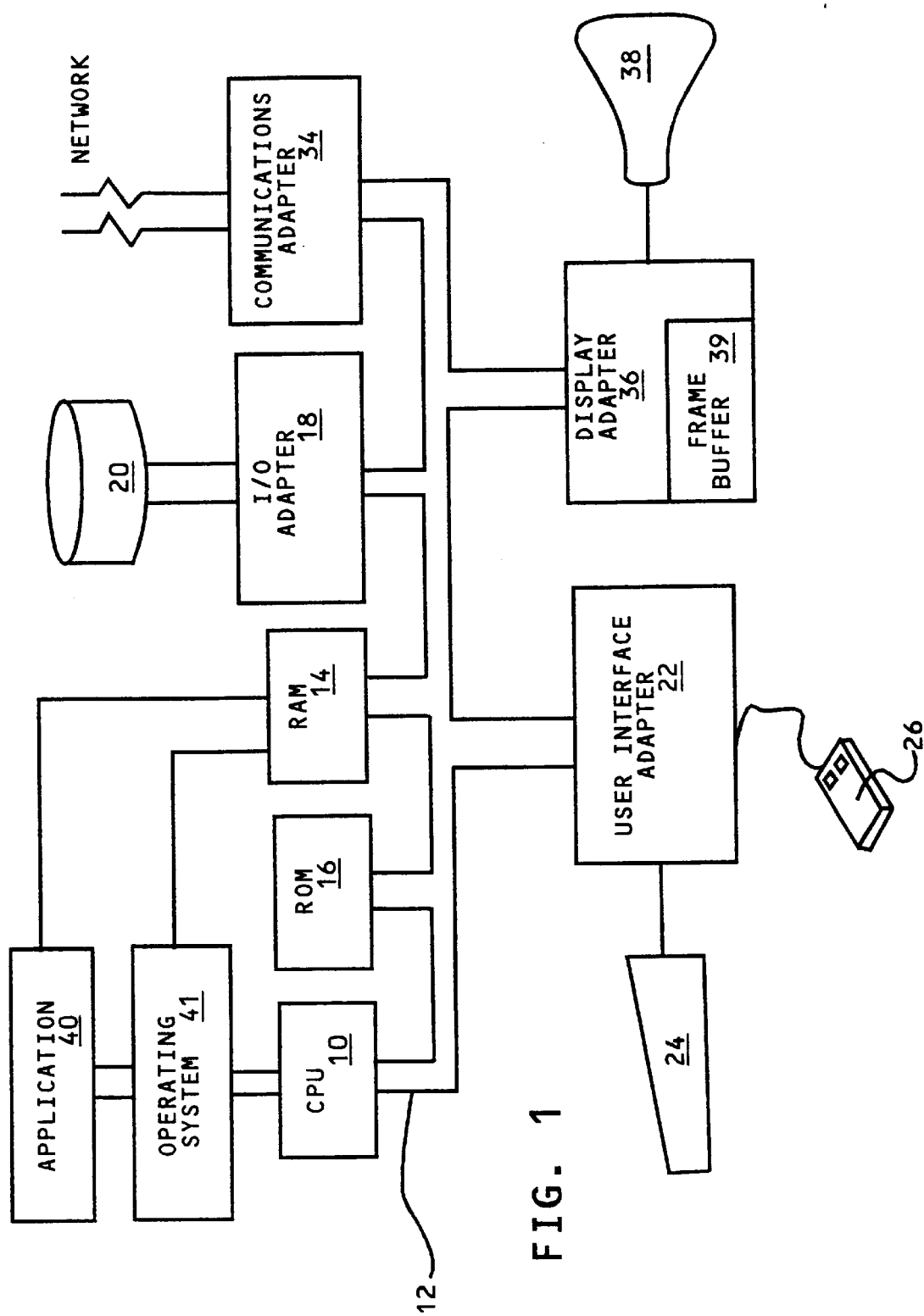
FIG. 1 is a block diagram of a generalized data processing system including a central processing unit in which the database search system of the present invention may be implemented.

Referring to FIG. 1, a typical data processing system is shown which may function as a basic computer controlled system used in implementing the present invention of searching databases through display interface trees of selectable search queries. A central processing unit (CPU) 10, such as one of the PC microprocessors or workstations, e.g., RISC System/6000(™) ("RISC System/6000" is a trademark of International Business Machines Corporation) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as AIX 6000(™) or OS/2(™) ("AIX 6000" and "OS/2" are trademarks of International Business Machines Corporation) available from IBM; Microsoft's Windows 95(™) or Windows NT(198 ), as well as UNIX and AIX operating systems. Application programs 40 controlled by the system are moved into and out of the main memory random access memory (RAM) 14 and consequently into and out of secondary storage, disk drive 20 as needed. The database search system of this invention, which will subsequently be described in greater detail is implemented as an application program 40. A read only memory (ROM) 16 is connected to CPU 10 via bus 12 and includes the basic input/output system (BIOS) that controls the basic computer functions. RAM 14, I/O adapter 18 and communications adapter 34 are also interconnected to system bus 12. I/O adapter 18 may be a small computer system interface (SCSI) adapter that communicates with the disk storage device 20. Communications adapter 34 interconnects bus 12 with an outside network enabling the data processing system to communicate with other such systems over a local area network (LAN) or wide area network (WAN), such as the Internet. It should be noted that the database search system of the present invention may be used with respect to databases which are accessed over a network. I/O devices are also connected to system bus 12 via user interface adapter 22 and display adapter 36. Keyboard 24 and mouse 26 are all interconnected to bus 12 through user interface adapter 22. It is through such input devices that the user may interactively search databases according to the present invention in the manner to be subsequently described. Display adapter 36 includes a frame buffer 39, which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24 or mouse 26 and receiving output information from the system via display 38.

There will now be described a simple illustration of the present invention with respect to the display screens of FIGS. 2 through 5. When the screen images are described, it will be understood that these may be rendered by storing an image and text creation programs, such as those in any conventional window operating system in the RAM 14 of the system of FIG. 1. The operating system is diagrammatically shown in FIG. 1 as operating system 41. An embodiment of the present invention will be described commencing with the display screen shown in FIG. 2. This initial display screen is presented to the viewer on display monitor 38 of FIG. 1. In accordance with conventional techniques, the user may control the screen interactively through a conventional I/O device, such as mouse 26, FIG. 1, which operates through user interface 22 to call upon programs in RAM 14 cooperating with the operating system 41 to create the images in frame buffer 39 of display adapter 36 to control the display on monitor 38.

Figure 2:
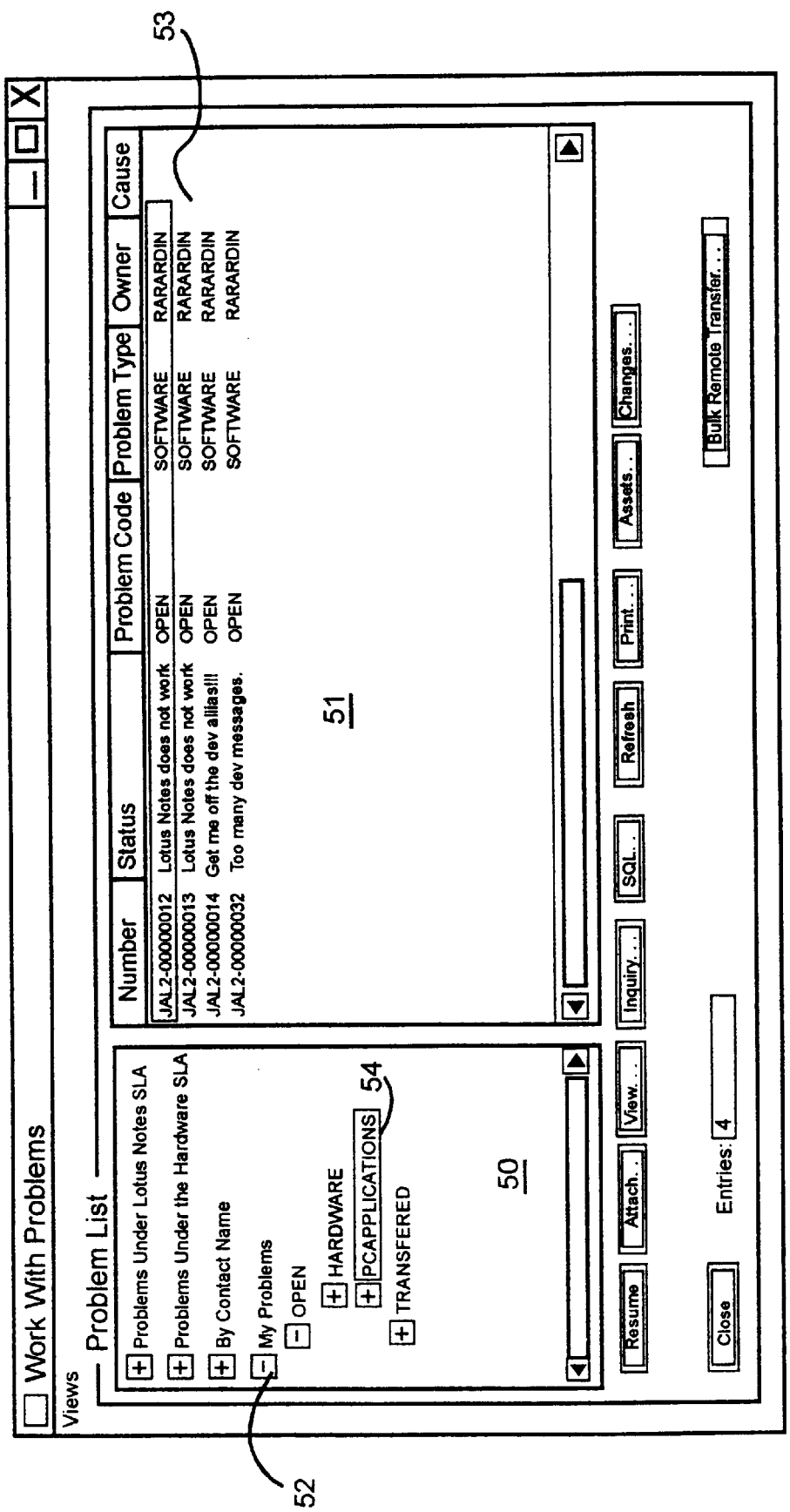
FIG. 2 is a diagrammatic view of a display screen on which a tree representative of a portion of a database is shown along side one aspect of a table view resulting from the execution of a subnode represented search query.

The display interface screen of FIG. 2 shows the interactive interface according to the present invention used to provide the user with a vehicle for searching a relational database or any other type of database covering the problems of a given computer system. Thus, the screen is entitled "Work with Problems". The interface is organized to permit the user to select an already stored SQL query and to have the search executed. While SQL is the most popular current database query language, other query languages could be used with equal effectiveness. A hierarchical tree having, at a high level, a set of root nodes, such as node 52, "My Problems", each represent a table view in the relational database which is presented in a first region 50 of the screen. Each of the root nodes may have a hierarchy of levels of subnodes such as subnode 54, "PC APPLICATIONS", each of which represent a stored search query into the table view of the root node. The tree of root nodes and their respective subnodes is, of course, configured for the particular database and desired view tables. The tables used in the illustrations may be conveniently configured by the process described in the copending concurrently filed patent application cross-referenced above.

In the illustration of FIG. 2, the user has selected subnode 54 which represents the SQL query, "SELECT * FROM PROBLEMS WHERE PROBLEM_CODE='OPEN 'AND SYSTEM='PC APPLICATIONS'". Upon user selection of subnode 54, the search represented by the query is executed, and the result is shown by table 53 in screen region 51 which may be considered to be an aspect of table view represented by the root node 52. Similarly, in the illustration of FIG. 4, the user has selected subnode 55, "LOTUS NOTES", which represents the SQL query, "SELECT * FROM PROBLEMS WHERE PROBLEM_CODE='OPEN' AND SYSTEM= 'PC APPLICATIONS'" AND COMPONENT='E-MAIL' AND ITEM='LOTUS NOTES 4.X'. Upon user selection of subnode 55, the search represented by the query is executed, and the result is shown by table 53 in screen region 51 which may be considered to be an aspect of the table view also represented by the root node 52. It should be noted that in table 53, the result of the search is identical in FIGS. 2 and 3 even though the search SQL query of FIG. 3 is limited by two additional hierarchical levels.

Figure 3:
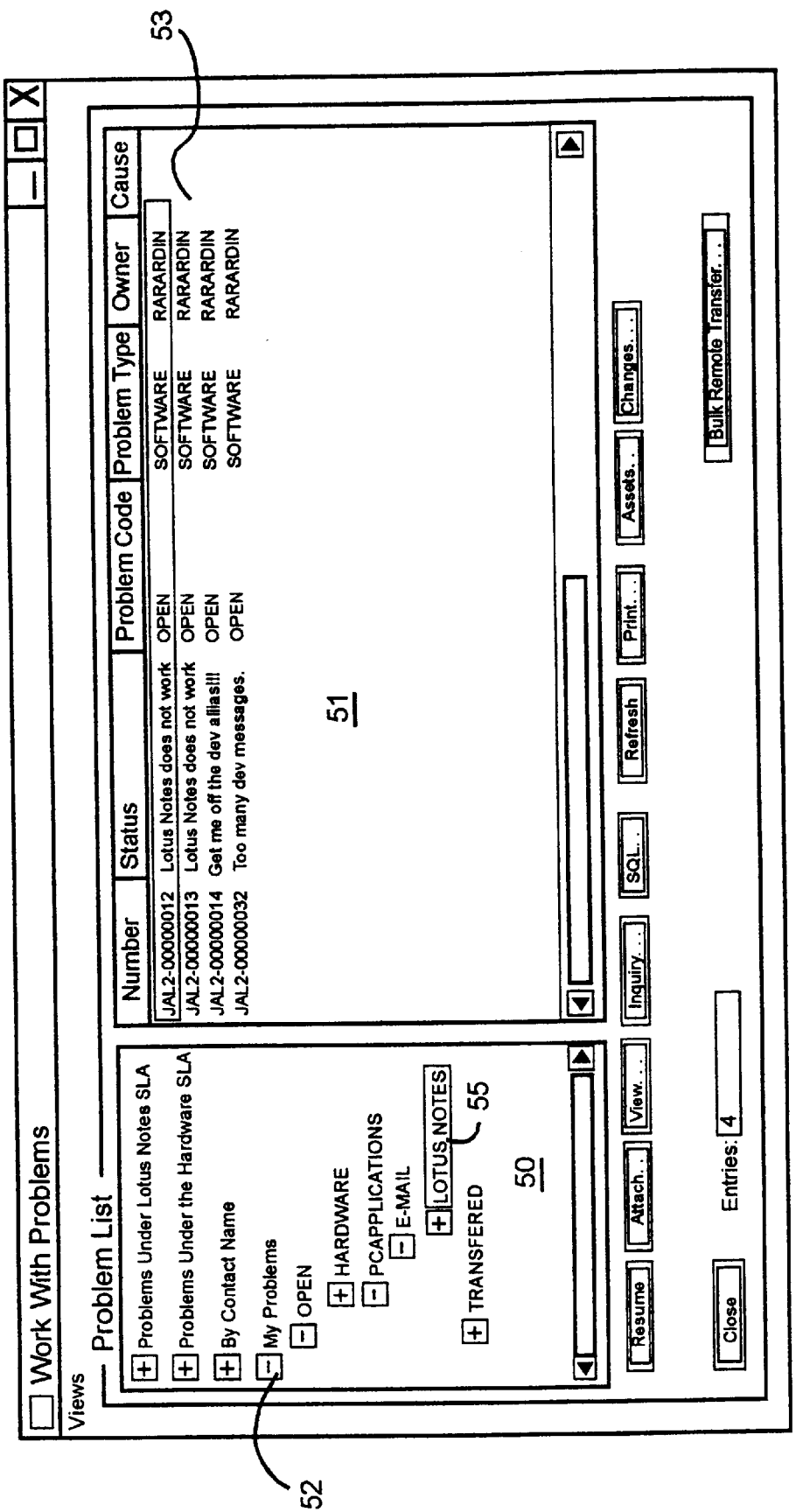
FIG. 3 is a diagrammatic view of a display screen like that of FIG. 2 in which a tree representative of a portion of a database is shown along side one aspect of a table view resulting from the execution of a different subnode represented search query.
Figure 4:
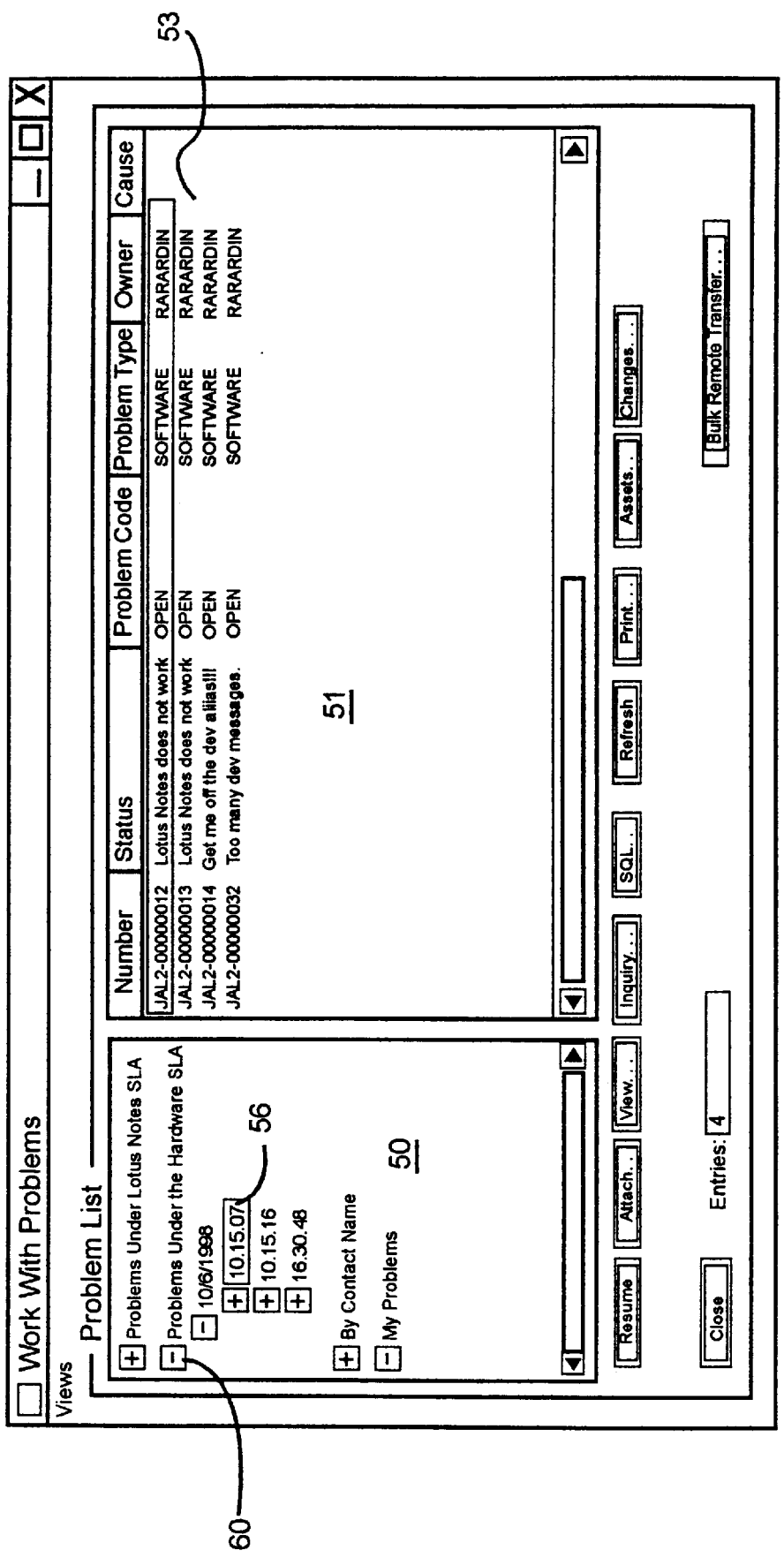
FIG. 4 is a diagrammatic view of a display screen like that of FIG. 2 except that the aspect of the table view results from the execution of a different subnode represented search query.

In the illustration of FIG. 4, the root node 60, "Problems under the Hardware SLA", is different from the root nodes in FIGS. 2 and 3 and the selected subnode 56, "10:15:07", and represent the SQL query, "SELECT FROM PROBLEMS WHERE THE PROBLEM$_{IN\ (SELECT\ REFERENCE\_ID\ FROM\ ACTIVE\_SLA\ WHERE\ BREECH\_DATE=}$10/06/98 'AND BREECH_TIME='10:15:07'). This again results in the same table 53 as in FIGS. 2 and 3 which illustrates that different search queries even through different root nodes still may provide the same search results.

Figure 5:
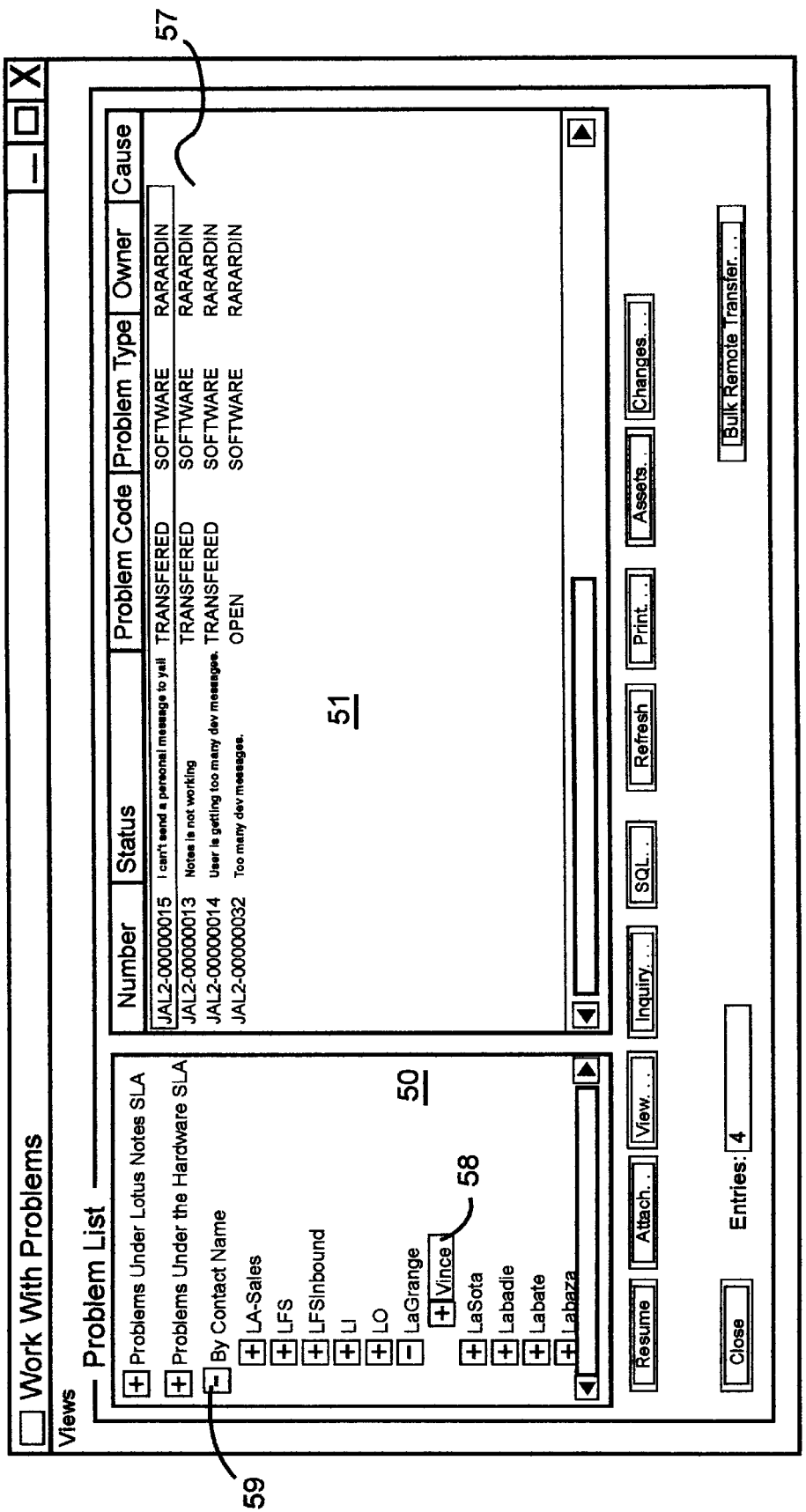
FIG. 5 is a diagrammatic view of a display screen like that of FIG. 4 except that the aspect of the table view shown results from the execution of a different subnode represented search query.

FIG. 5 is another illustration of the selection of a subnode 58 under another root node 59 which provides the search results in table 57, which table is quite different from the table results 53 of FIGS. 2, 3 and 4.

Figure 6:
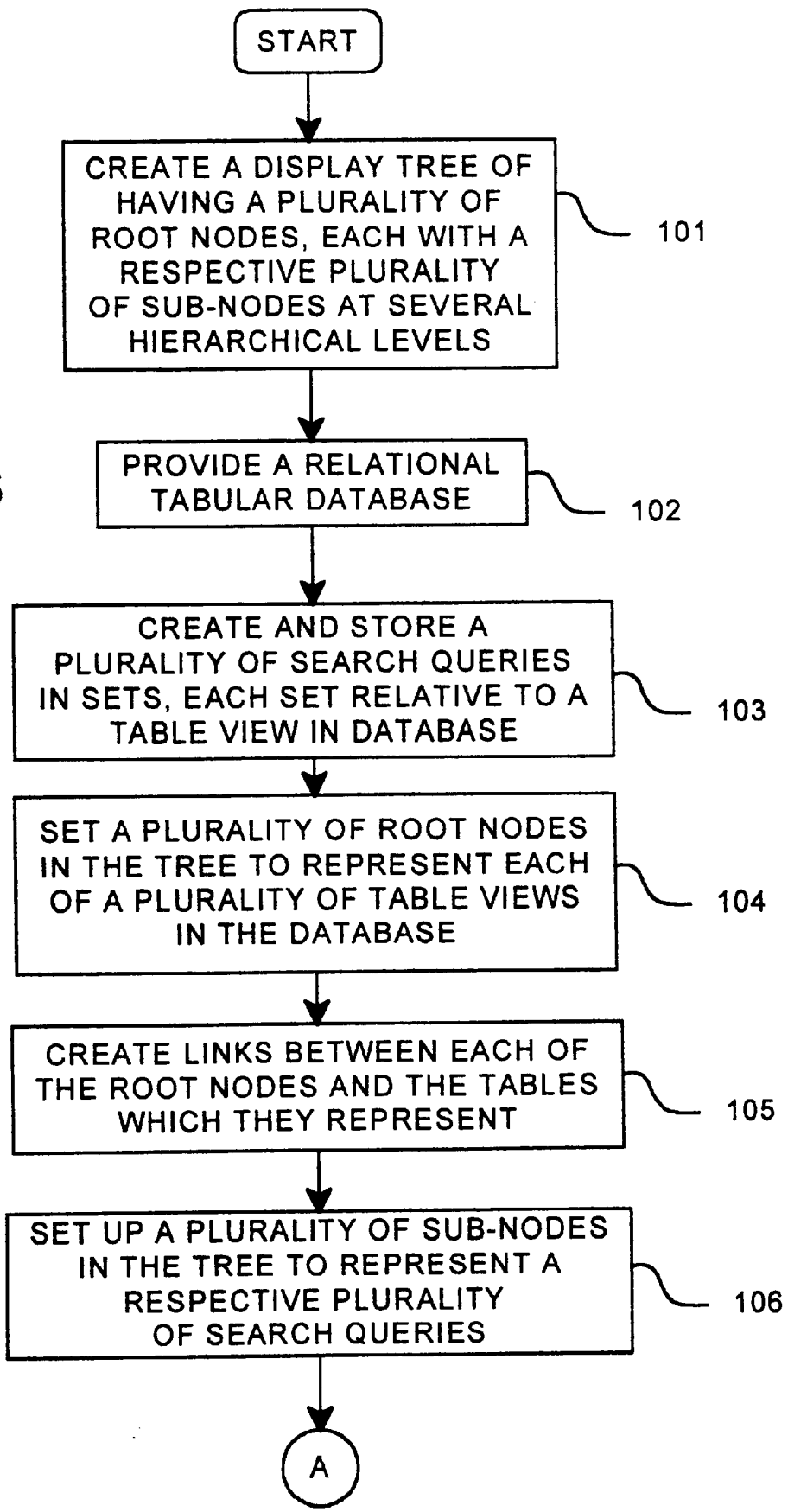
FIGS. 6 and 7 are a combined flowchart of the basic elements which are set up in the system and program in a computer controlled display system for creating and using the tree of search queries system of the present invention.
Figure 7:
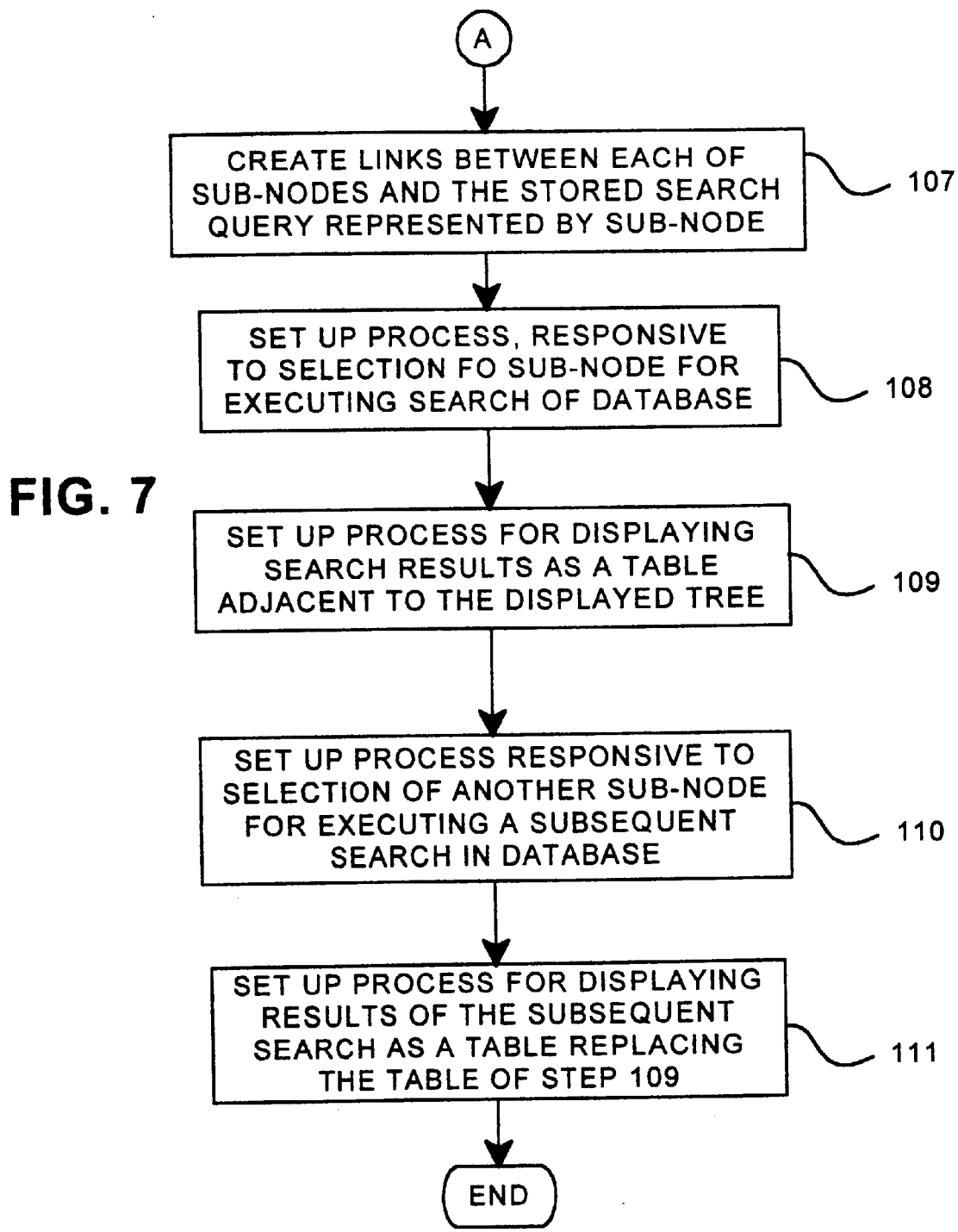
Figure 8:
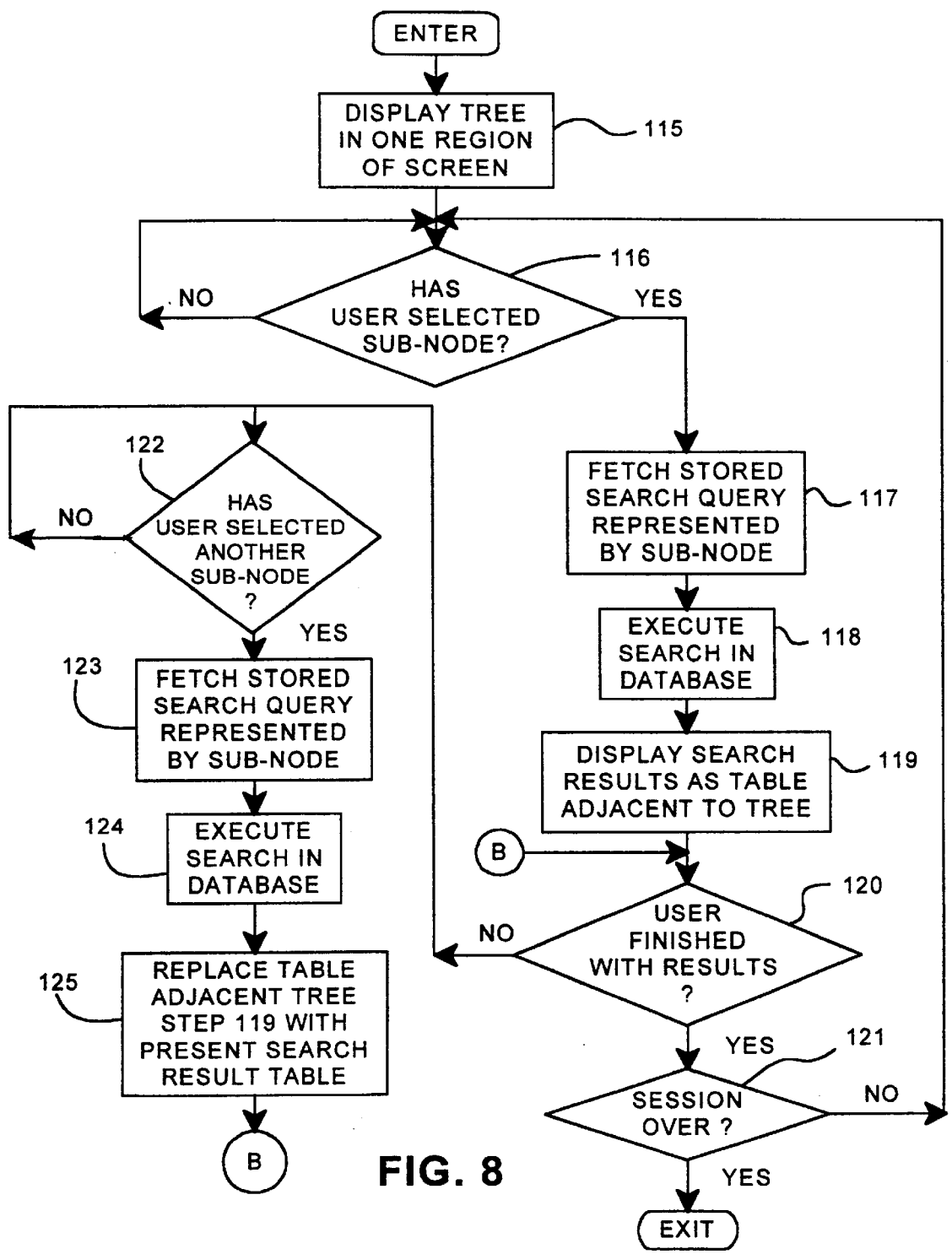
FIG. 8 is a flowchart of the steps involved in running database search queries according to the set up of FIGS. 6 and 7.

Now with reference to FIGS. 6 through 8, we will describe a process implemented by the present invention in conjunction with the flowcharts of these figures. The steps in FIGS. 6 and 7 relate to the setting up of the tree structure of this invention which will provide the search queries. First, step 101, a display tree is created with a plurality of root nodes, each of which have a respective plurality of subnodes at several hierarchical levels. The relational database to be searched is provided, step 102. A plurality of search queries are created in sets, each relative to a table view of the database, step 103. A plurality of root nodes in the tree are set to respectfully represent each of a plurality of table views in the database, step 104. Links are created between each of the root nodes and the particular tables they respectively represent, step 105. Then there is set up a plurality of subnodes in the tree to respectively represent a plurality of search queries, step 106. The flow then branches to FIG. 7 via entry point "A". Step 107, links are created between each of the subnodes and the stored query represented by the subnode. Then, a process is set up which, in response to the selection of a subnode, will execute the database search represented by the subnode, step 108. A process is set up for displaying the search results as a table adjacent to displayed tree, step 109. A process is set up which, responsive to the selection of another subnode, will execute a search in the database using the query represented by the subnode, step 110, and a process is set up for displaying the results of the subsequent search as a table replacing the table of step 109.

Now, with reference to FIG. 8, we will describe an illustrative run of a search involving queries set up according to the process described in FIGS. 6 and 7. The search program is run as an application program, either alone or incorporated into a database management system, such as Access(™), dBase IV or dBase 5. First, step 115, the tree is displayed in one region of a display screen, e.g. region 50, FIG. 2. Then, a determination is made, decision step 116, as to whether the user has selected a subnode representative of a search query. If No, the process is returned to step 116 until there is a Yes decision. Then, the stored search query represented by the subnode is fetched, step 117, and executed in the database, step 118. The search results are displayed as a table, step 119, in a region adjacent to the tree, e.g. region 53, FIG. 2. Next, step 120, a determination is made as to whether the user is finished with the results, step 120. If Yes, then a further determination is made as to whether the session is over, step 121. If Yes, then exit, but if No, then the process is branched back to step 116 where a determination is made as to whether another subnode has been selected. If the decision from step 120 is No, the user is still using the results, then the process goes to step 122 where a determination is made as to whether subnode has been selected. If No, then the process remains at step 122 until another subnode is selected, while the last search result table from step 119 continues to be displayed. When another subnode is selected and the decision from step 122 is, thus, Yes then the stored search query represented by the subnode is fetched, step 123, and executed in the database, step 124. The search results are displayed as a table, step 125 replacing the last search result table of step 119 in the region adjacent to the tree, e.g. region 53, FIG. 2, after which the process is branched back to step 120 via entry point "B" where a determination is again made as to whether the user is finished with the search results, and the process then continues as previously described.

One of the preferred implementations of the present invention is as an application made up of programming steps or instructions resident in RAM 14, FIG. 1, during computer operations. Until required by the computer system, the program instructions may be stored in another readable medium, e.g., in disk drive 20, or in a removable memory such as an optical disk for use in a CD-ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A data processor controlled user-interactive display interface for displaying a set of stored search queries to a stored database comprising:
   means for displaying a tree having
      at least one root node representative of a view into a table from said database, and
      a plurality of subnodes under said root node, each subnode representative of a stored search query for said table view,
   means for executing a search represented by a subnode in response to a user selection of said subnode, and
   means for presenting the results of said executed search on said display.

2. A data processor controlled user-interactive display interface for searching in a stored database comprising:
   means for presenting a tree having a plurality of selectable nodes arranged in a hierarchy in one region of a display interface screen,
   at least one root node in said tree representative of a table view,
   a plurality of subnodes under said root node in said tree, each subnode representative of a stored search query for said table view, and
   means responsive to the selection of a subnode for presenting in another region of the display interface screen, an aspect of said table view relative to the search query represented by the selected subnode.

3. The display interface of claim 2, wherein said database is a relational database.

4. The display interface of claim 3 further including means for generating said search query in Structured Query Language.

5. The display interface of claim 2 wherein said tree has a plurality of root nodes.

6. A method for providing a data processor controlled user-interactive display interface for displaying a set of stored search queries to a stored database comprising:
   displaying a tree having
      at least one root node representative of a view into a table from said database, and
      a plurality of subnodes under said root node, each subnode representative of a stored search query for said table view,
   executing a search represented by a subnode in response to a user selection of said subnode, and
   presenting the results of said executed search on said display.

7. A method for providing a data processor controlled user-interactive display interface for searching in a stored database comprising:
   presenting a tree having a plurality of selectable nodes arranged in a hierarchy in one region of a display interface screen,
   providing at least one root node in said tree representative of a table view, providing a plurality of subnodes under said root node in said tree, each subnode representative of a stored search query for said table view, executing a search represented by a subnode in response to a user selection of said subnode, and presenting in another region of the display interface screen, an aspect of said table view resulting from said executed search.

8. The method of claim 7, wherein said database is a relational database.

9. The method of claim 8 further including the step of generating said search query in Structured Query Language.

10. The method of claim 7 wherein said tree has a plurality of root nodes.

11. A computer program having program code included on a computer readable medium for providing a data processor controlled user-interactive display interface for searching in a stored database comprising:

means for presenting a tree having a plurality of selectable nodes arranged in a hierarchy in one region of a display interface screen, at least one root node in said tree representative of a table view, a plurality of subnodes under said root node in said tree, each subnode representative of a stored search query for said table view, and means responsive to the selection of a subnode for presenting in another region of the display interface screen, an aspect of said table view relative to the search query represented by the selected subnode.

12. The computer program of claim 11, wherein said database is a relational database.

13. The computer program of claim 12 further including means for generating said search query in Structured Query Language.

14. The computer program of claim 12 wherein said tree has a plurality of root nodes.

* * * * *